July 12, 1949.  A. THALMANN  2,475,861

CHUCK

Filed Aug. 20, 1946

Inventor:
Alfred Thalmann
by Sommers & Young
Attorneys

Patented July 12, 1949

2,475,861

UNITED STATES PATENT OFFICE 2,475,861

CHUCK

Alfred Thalmann, Rorschacherberg, Switzerland, assignor to Rigid Limited, Rorschacherberg, Switzerland Application August 20, 1946, Serial No. 691,768
In Switzerland August 30, 1945

4 Claims. (Cl. 279—75)

My present invention relates to improvements in chucks of the quick-action type for securing bodies, e. g. a tool-holder or a tool on the working spindle of a machine tool, and the objects of my improvement are first to ensure a highly accurate self-centering, a positive drive, a speedy and fast clamping action, and second an easy and ready detachment or slacking of the chuck elements at any load.

Figure 1:
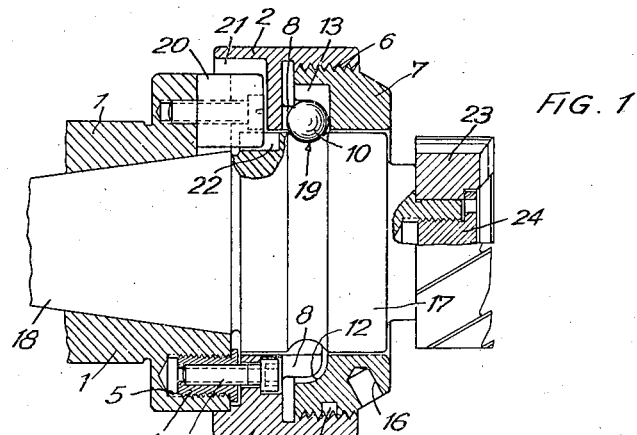
Figure 2:
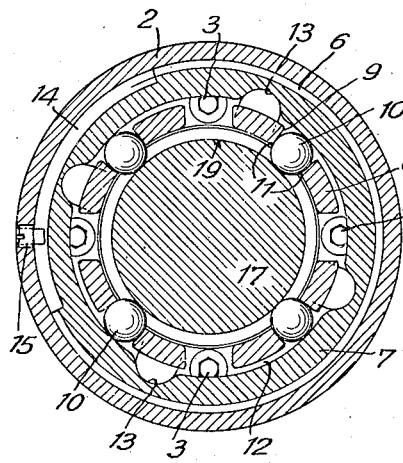
Figure 3:
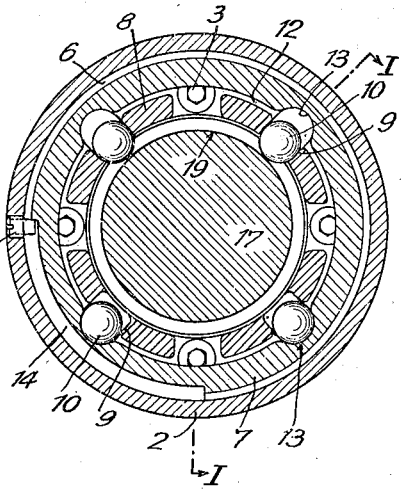
Figure 4:
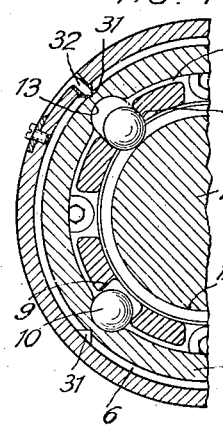
Figure 5:
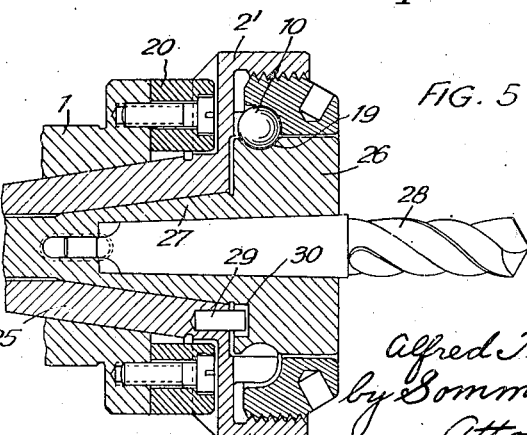

I attain these and related objects by the chuck shown, in two forms and a minor modification, in the accompanying drawing, in which Fig. 1 is an axial section on line I—I of Fig. 3, Fig. 2 a cross-section of Fig. 1, the clamping elements being in the active, fast or grasping position, Fig. 3 the same cross-section, the clamping elements being in the inactive, slacked or open position, Fig. 4 a partial cross-section, similar to Fig. 3, of a slightly modified form, and Fig. 5 an axial section of a second form of chuck.

In the form shown in Figs. 1-3, a chuck socket 2 is secured on the head 1 of the working spindle of a machine tool by means of four screws 3 engaged in threaded bushes 4 which in their turn are driven home in threaded bores 5 of spindle-head 1. The chuck socket 2 is internally threaded, and an externally threaded clamping ring 7 is engaged therein. Further, a ball-retainer ring 8 is formed on the chuck socket 2, wherein four grasping balls 10 are disposed in four grooves 9.

The said grooves 9 are so adapted that the balls 10 are radially and axially displaceable therein. The balls 10 however are withheld in the grooves 9 by the inner edges 11 (Fig. 2) thereof so as to prevent the balls from dropping out of the chuck in its slacked position (Fig. 3).

The clamping ring 7 is provided with a peripheral locking groove 12 which comprises a recess 13 for each ball 10. To limit the rotational movement of the clamping ring 7 in the chuck socket 2, a partial peripheral groove 14 is provided thereon which is engaged by a stop-screw 15. In the clamping ring 7, furthermore, bores 16 are provided and which are adapted to be engaged by a stud wrench (not shown) for locking and slacking the chuck.

The tool base which may be a tool shank or tool holder shank 17 to be clamped fast comprises a conical portion 18 centered in the spindle-head 1, and a peripheral clamping groove 19, co-acting with the balls 10. The tool-holder and the chuck socket 2 are positively driven or caught by means of a follower-block 20 engaged in a catch-groove 21 of the chuck socket 2 and, at the same time, in a catch-groove 22 of the tool-holder 17. A milling cutter 23 is secured to the tool-holder 17 by means of a screw 24.

In the slack-position (Fig. 3) of the clamping ring 7, the tool-holder 17 can be inserted into the chuck, since the balls 10 in such position may roll from the groove 12 into the recesses 13. The latter's depth, added to the thickness of the retainer-ring 8, corresponds to the ball-diameter. Having inserted the tool-holder 17, the clamping ring 7 is turned from the slack-position into clamping position (Fig. 2), thus being axially displaced on its threads. The balls thus are clamped fast in the grooves 12 and 19 of the clamping ring 7 and the tool-holder 17 respectively, so that the conical portion 18 of the latter is pressed fastly onto its seat and the tool-holder 17 thus centered in the spindle-head 1. For slacking the chuck, the clamping ring 7 is turned from the position shown in Fig. 2 into that of Fig. 3, upon which the tool-holder 17 may be readily withdrawn from the chuck.

The rotational movement of the ring 7 in its slack-position also may be limited, as shown in Fig. 4, by means of cross-grooves 31 disposed above the recesses 13 and in the threads 6 of ring 7, which grooves are engaged by a leaf-spring dog 32 secured on the outside of the chuck socket 2 upon reaching any one of the four inactive or slack positions of the chuck.

The form of invention shown in Fig. 5 differs from that of Figs. 1-3 in that the chuck socket 2' comprises a shank 25 fitting into the bore of the spindle-head 1, and held therein, in a manner known, by means of a tie rod (not shown). The chuck socket 2', here again, is taken along by driver or follower-blocks 20. The tool-holder 26 comprises a clamping groove 19 and a conical portion 27 centered in a conical bore of the chuck-part 2'. A drill 28 is inserted in the tool-holder 26. For taking along the latter, a follower 29 is mounted on the shank 25 of the chuck socket 2' and is engaged in a recess 30 of the holder 26.

While the chuck socket in the forms of invention described is secured to the spindle-head, the latter itself also may be adapted as chuck socket.

What I claim and desire to secure by Letters Patent, is:

1. A chuck of the class described, for holding a tool base having a peripheral groove comprising, a socket provided internally with threads, a ball-retainer ring in the chuck socket for housing a plurality of balls, an externally threaded clamping ring for engaging the thread of said socket and provided with an inner peripheral groove with radial recesses into which the said balls may enter in the slack-position of the clamping ring, said clamping ring being rotatable from the slack-position into a clamping position by being axially displaced on its threads toward the said balls which are clamped in the said clamping-ring groove on one hand and in the peripheral groove of the tool base on the other hand so as to center and clamp the tool base.

2. In a chuck set forth in claim 1 and, a ball-retainer ring for engaging the balls on their inner sides for preventing their dropping out in the slack-position of the clamping ring.

3. In a chuck set forth in claim 1 and, abutments on the clamping ring for limiting the rotational throw of the clamping ring.

4. A chuck according to claim 1 and in which the spindle is formed with a centering means by which the tool base to be clamped is centered, and the chuck socket secured to the spindle-head, the tool base, and the socket are driven by the spindle head by means of drivers or followers.

ALFRED THALMANN.

REFERENCES CITED

The following references are of record in the file of this patent:

UNITED STATES PATENTS

| Number | Name | Date |
|---|---|---|
| 680,448 | Wallace | Aug. 13, 1901 |
| 1,283,173 | Heinkel | Oct. 29, 1918 |
| 1,298,196 | Gairing | Mar. 25, 1919 |
| 1,533,875 | McCleary | Apr. 14, 1925 |
| 1,636,421 | Knott | July 19, 1927 |
| 1,840,830 | Bristol | Jan. 12, 1932 |

FOREIGN PATENTS

| Number | Country | Date |
|---|---|---|
| 318,336 | Germany | Jan. 1920 |